United States Patent [19]
Richard

[11] Patent Number: 5,947,676
[45] Date of Patent: Sep. 7, 1999

[54] HIGH TEMPERATURE DIE LIFT SYSTEM

[76] Inventor: John A. Richard, 5911 Stepladder, Parma, Mich. 49269

[21] Appl. No.: 08/960,243

[22] Filed: Oct. 29, 1997

[51] Int. Cl.$^6$ ....................................................... B30B 15/02
[52] U.S. Cl. ........................ 414/535; 100/224; 193/35 SS
[58] Field of Search ............................ 414/535; 100/224; 285/242, 249; 193/35 SS

[56]  References Cited

U.S. PATENT DOCUMENTS

| | | | |
|---|---|---|---|
| 185,326 | 12/1876 | Jones | 285/242 |
| 2,394,632 | 2/1946 | Parker | 285/249 |
| 3,349,166 | 10/1967 | Ziegler | 285/242 |
| 3,935,811 | 2/1976 | Lenz et al. | 100/53 |
| 4,498,384 | 2/1985 | Murphy | 100/224 |
| 4,691,554 | 9/1987 | Murphy | 72/448 |
| 4,819,554 | 4/1989 | Fleischer et al. | 414/535 |
| 5,206,982 | 5/1993 | Brown | 100/224 |

FOREIGN PATENT DOCUMENTS

| | | | |
|---|---|---|---|
| 387168 | 9/1990 | European Pat. Off. | 193/35 SS |
| 6602558 | 8/1967 | Netherlands | 254/93 HP |

*Primary Examiner*—Thomas J. Brahan
*Attorney, Agent, or Firm*—Lyon, P.C.

[57] ABSTRACT

The disclosure relates to a heat resistant die lift system. The system comprises an upwardly opening cavity in a bolster having a vertically movable rail therein. An airbag extends longitudinally of the cavity under the rail. A plurality of rollers are supported by the rail so as to be movable vertically therewith. Inflation of the airbag effects elevation of the rails and rollers into engagement with the bottom of the die and elevation of the die relative to the press bolster. One end of the airbag is telescoped over a complimentary conical nozzle in an air manifold and is retained by a locking block having a conical bore complimentary to the nozzle so as to eliminate the use of adhesives or sealants.

3 Claims, 1 Drawing Sheet

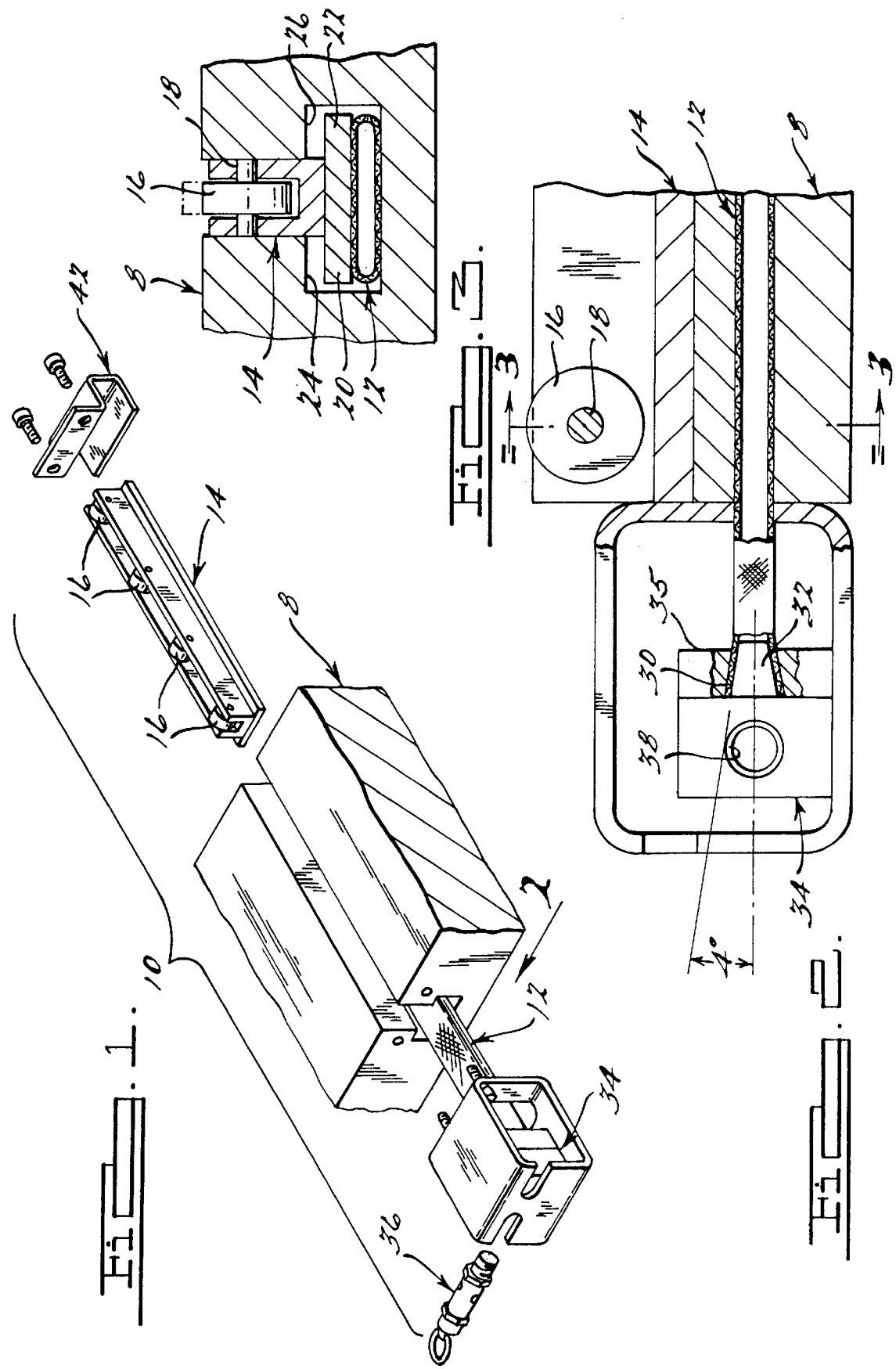

HIGH TEMPERATURE DIE LIFT SYSTEM

BACKGROUND OF THE INVENTION

Relatively heavy forging, die casting and plastic injection molding dies often present a handling problem when such dies are assembled with or removed from the bolster of a machine. The problem is complicated by the fact that such dies often reach a temperature in the range of 500° F. Thus, it is essential that every component of a die lift system be capable of withstanding such elevated temperatures. The principal weakness of known air actuated die lift systems is failure of the adhesive used to seal the airbag to the air manifold of the die lift system.

SUMMARY OF THE INVENTION

The die lift system of the instant invention solves the aforementioned problem by utilizing a silicone airbag in conjunction with a specially configured compressed air manifold that eliminates the requirement for an adhesive to seal the airbag to the manifold. The airbag is sealed to the manifold by telescoping the airbag over a cone shaped nozzle on the manifold and retaining the airbag in position by a complimentary locking block. The nozzle of the manifold and the locking block are machined to rigid tolerances to insure positive fit with the I.D. and O.D. of the silicone airbag.

Since the connection between the manifold and the airbag is critical, it must be protected from damage due to, for example, impact of lift trucks, scrap steel, etc., with the end of the airbag assembly. The present invention encloses the manifold and the end of the airbag disposed over the nozzle of the manifold to protect the connection therebetween from such damage.

BRIEF DESCRIPTION OF THE DRAWINGS

FIG. 1 is an exploded perspective view of a die lift system in accordance with the instant invention;

FIG. 2 is a cross sectional view of the assembled die lift with the airbag in the inflated condition; and FIG. 3 is a cross sectional view taken substantially along the line 3—3 of FIG. 2 with the airbag in the deflated condition.

DETAILED DESCRIPTION OF THE PREFERRED EMBODIMENT(S)

As seen in FIG. 1 of the drawing, a bolster 8 of, for example, a forging or casting machine, is provided with a die lift system 10, in accordance with an exemplary constructed embodiment of the instant invention. The die lift system 10 facilitates movement of dies (not shown) to and from the bolster 8. The die lift system 10 comprises heat resistant airbag 12 adapted to be inflated by compressed air at conventional shop pressures, for example, 50–100 lbs. per square inch. As in well known in the art, the airbag 12 supports a rail 14 having a plurality of rolls 16 thereon. The rolls 16 are journaled on shafts 18 so as to elevate a die (not shown) for movement upon inflation of the airbag 12 and elevation of the rail 14.

Upward movement of the rail 14 is limited by flanges 20 and 22 thereon that extend under complimentary shoulders 24 and 26, respectively on the bolster 8.

In accordance with the instant invention one end portion 30 of the airbag 12 is telescoped over a conical nozzle 32 of an air pressure manifold 34. A locking block 35 having a conical bore complimentary to the nozzle 32 is telescoped over the end portion 30 of the airbag 12 to create and maintain an airtight seal between the airbag 12 and manifold 34. The optimum angle of the conical surface on the nozzle 32 relative to the central axis thereof is four degrees (4°). The aforesaid angular and structural relationship results in a connection that is devoid of adhesive or sealants that could be compromised by high temperature.

The manifold 34 is provided with a pressure relief valve 36 and an air inlet aperture 38 which accepts a standard air line connector (not shown).

In accordance with another feature of the invention, an enclosure 40 envelopes the nozzle 32 of the manifold 34 and end 30 of the airbag 12 for the protection thereof, but provides for ready access to the relief valve 36 and air inlet aperture 38. A suitable end fitting 42 protects the opposite end of the airbag 12.

I claim:

1. In a die transfer system comprising a bolster for the support of a die, a horizontally extending upwardly opening cavity, in said bolster, a horizontally extending vertically movable rail in said cavity, a plurality of rollers journaled on said rail, so as to be movable vertically therewith, and an airbag extending longitudinally of said cavity under said rail and engageable with the bottom thereof whereby inflation of said airbag effects elevation of said rail and rollers into engagement with the bottom of said die and elevation of said die relative to said bolster, the improvement comprising:

an air manifold on said bolster at one end of said cavity having an inlet orifice for the admission of air under pressure, a conical nozzle extending from said manifold having one end of said airbag telescoped thereover, and a locking block having a conical bore complimentary to said nozzle and telescoped over the one end of said airbag and said nozzle to effect a seal between said airbag and manifold.

2. The system of claim 1 wherein said nozzle is divergent from said manifold and the slope of said nozzle is four degrees relative to the central axis thereof.

3. A system in accordance with claim 2 wherein said manifold is supported by an enclosure secured to said bolster.

* * * * *